US007270695B2

(12) United States Patent
Kim et al.

(10) Patent No.: US 7,270,695 B2
(45) Date of Patent: Sep. 18, 2007

(54) SYNTHESIS OF NANOSIZED METAL PARTICLES

(75) Inventors: Insoo Kim, Busan (KR); Gang Hyuk Kim, Busan (KR); Chang Gun Lee, Busan (KR); Young Jin Kim, Conway, AR (US); Charles Smith, Conway, AR (US)

(73) Assignees: Dong-A University, Busan (KR); Tokusen U.S.A. Inc., Conway, AK (US)

( * ) Notice: Subject to any disclaimer, the term of this patent is extended or adjusted under 35 U.S.C. 154(b) by 362 days.

(21) Appl. No.: 10/814,151

(22) Filed: Apr. 1, 2004

(65) Prior Publication Data

US 2005/0217429 A1 Oct. 6, 2005

(51) Int. Cl.
*B22F 9/24* (2006.01)
(52) U.S. Cl. .......................................... 75/371; 977/896
(58) Field of Classification Search ................. 75/369, 75/371
See application file for complete search history.

(56) References Cited

U.S. PATENT DOCUMENTS

| 6,706,902 B2 * | 3/2004 | Sturmann et al. ............ 549/523 |
| 6,969,690 B2 * | 11/2005 | Zhou et al. .................. 438/787 |
| 2003/0185889 A1 * | 10/2003 | Yan et al. .................... 424/484 |

FOREIGN PATENT DOCUMENTS

CN              1480584 A   *   3/2004

* cited by examiner

*Primary Examiner*—George Wyszomierski
(74) *Attorney, Agent, or Firm*—Ked & Associates, LLP

(57) ABSTRACT

The present invention is directed to methods for forming nanosized metal particles. Preferably, nanosized noble metal particles are formed. According to the methods of the invention, a product containing nanosized metal particles in a solvent are formed. Additionally, processing to remove undesirable byproducts created or used during the fabrication process are not necessary.

27 Claims, 3 Drawing Sheets

Micron-sized Ag particles formed from direct reaction between silver carbonate and hydrogen peroxide

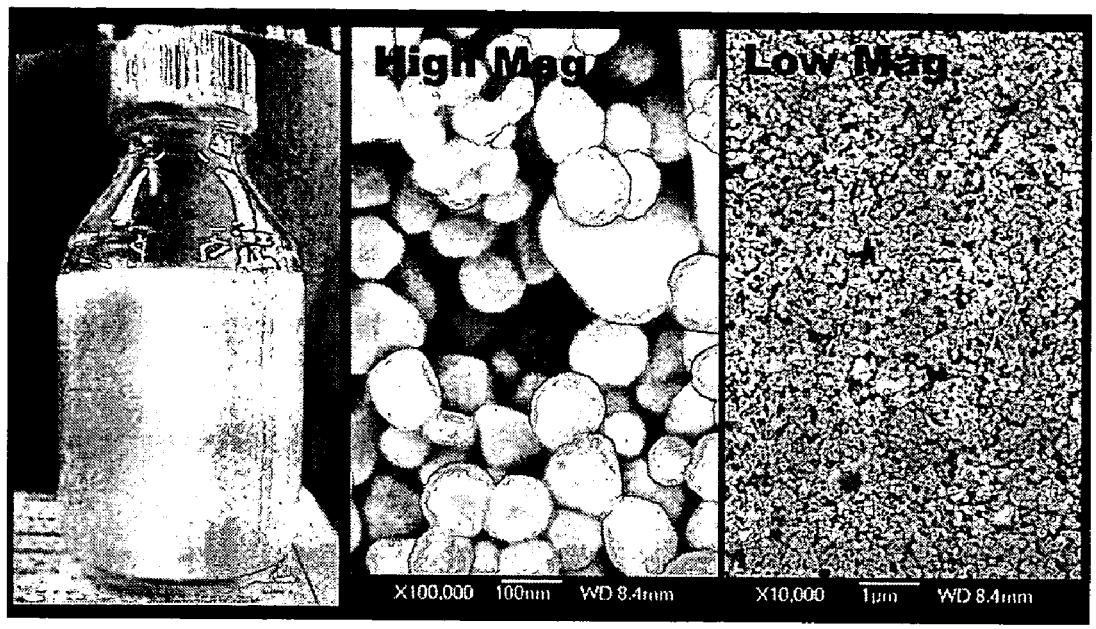
Fig. 1. Ag particles obtained by centrifuge operating to 17,000rpm for 10 min

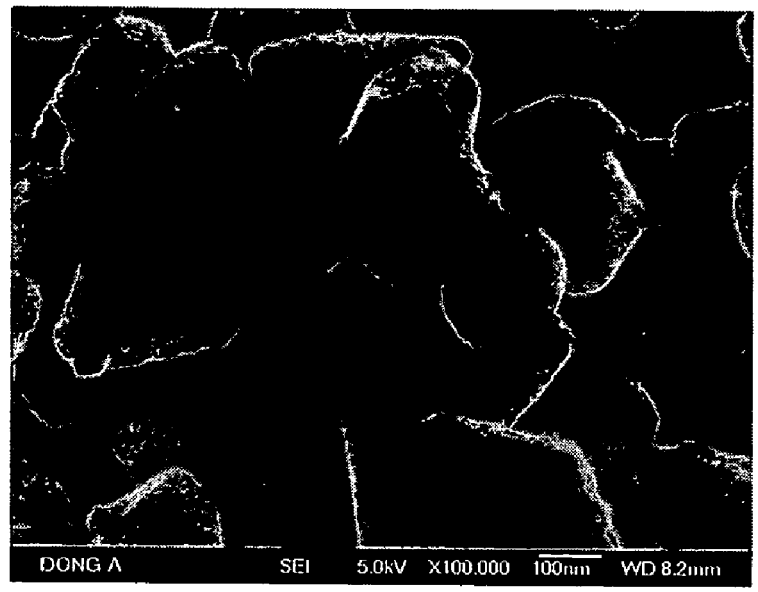
Fig. 2. Ag particles formed from the conditions mentioned in example 2.
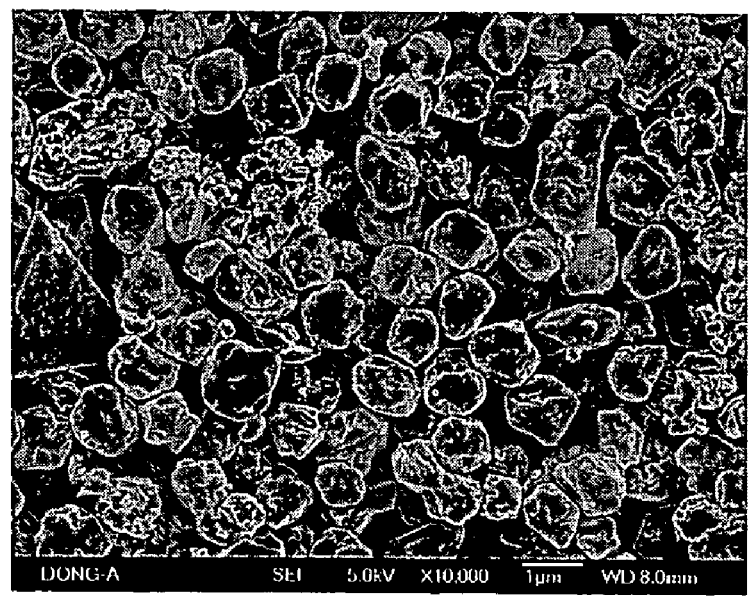
Fig. 3. Micron-sized Ag particles formed from direct reaction between silver carbonate and hydrogen peroxide

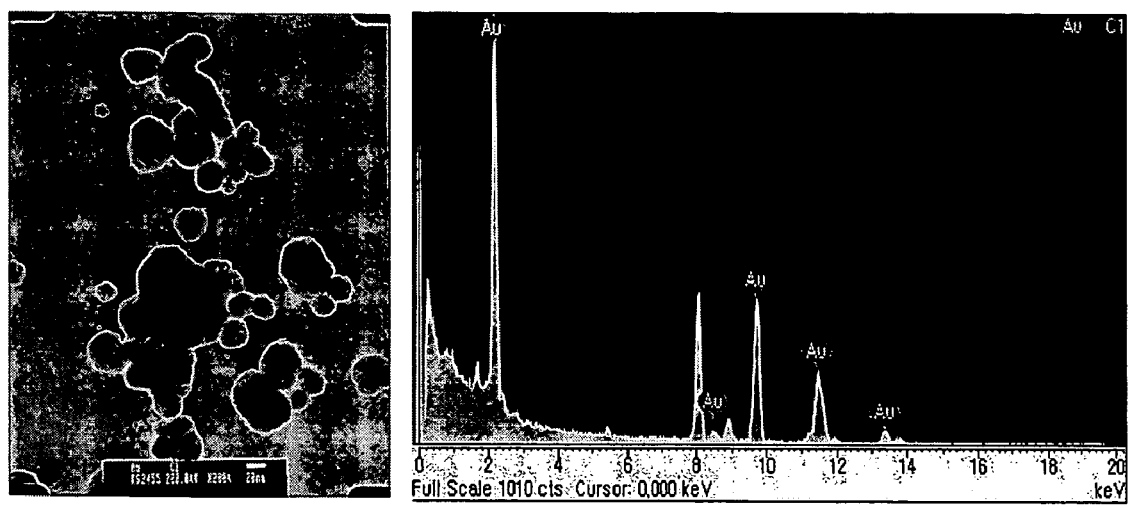
Fig. 4. Nano-sized Au particles formed from the conditions mentioned in example 4.

SYNTHESIS OF NANOSIZED METAL PARTICLES

FIELD OF THE INVENTION

The present invention relates to a synthesis method for producing nanosized noble metal particles suspended in pure solvents, such as water, lower alkyl alcohols and lower alkyl substituted aromatics, without additional separation and rinsing processes.

BACKGROUND OF THE INVENTION

Nanosized particles have attracted significant industrial interests. The unique size-dependent properties of nanosized materials have promising applications in catalysis, electronic and optical devices, and medical fields.

A number of syntheses, including chemical reduction, photochemical, sonochemical, and gas evaporation, have been developed to prepare nanosized metal particles. Among these, the chemical reduction method is well known as the most preferable method to synthesize nanosized metal particles. In the case of the chemical reduction method, however, reduction agents used for the fabrication could create contamination easily. Therefore, additional processes to remove the contaminants are necessary. Moreover, further processing is required to disperse the metal particles into a pure solvent.

The present invention overcomes these problems by providing a method whereby high purity noble metal particles suspended stably in pure solvent may be synthesized without additional processing to remove extraneous byproducts created during the fabrication process. Even though a laser ablation method recently reported looks like a unique process to create metal particles suspended in water, it is estimated to be an inefficient process in terms equipment cost and capability for mass production. The disclosed invention overcomes the inefficiencies of prior art production of suspended, high purity, nanosized metal particles in pure solvent and, additionally, has relatively low production costs.

SUMMARY OF THE INVENTION

An object of the invention is to solve at least the related art problems and disadvantages, and to provide at least the advantages described hereinafter.

Accordingly, it is an object of the present invention to provide methods for providing nanosized metal particles dispersed in a pure solvent. Other objects, features and advantages of the present invention will be set forth in the detailed description of preferred embodiments that follows, and in part will be apparent from the description or may be learned by practice of the invention. These objects and advantages of the invention will be realized and attained by the methods and compositions particularly pointed out in the written description and claims hereof.

In accordance with these and other objects, a first embodiment of the present invention is directed to a method for forming nanosized metal particles comprising: (i) dispersing a plurality of metal precipitates in a suitable solvent, each of the metal precipitates comprising at least one metal compound; and (ii) adding to the solvent an effective amount of at least one peroxide to form a product consisting essentially of a plurality of nanosized metal particles in the solvent.

A second embodiment of the present invention is directed to nanosized metal particles prepared by the methods disclosed herein.

BRIEF DESCRIPTION OF THE DRAWINGS

FIG. 1 shows Ag particles having an average diameter of about 100 nm made according to the methods of the present invention.

FIG. 2 shows Ag particles having an average diameter of about 150 nm made according to the methods of the present invention.

FIG. 3 shows Ag particles having an average diameter of about 1,000 nm made according to the methods of the present invention.

FIG. 4 shows Au particles having an average diameter of about 40 nm made according to the methods of the present invention.

DETAILED DESCRIPTION OF PREFERRED EMBODIMENTS

A first preferred embodiment of the present invention is directed to a method for forming nanosized metal particles comprising: (i) dispersing a plurality of metal precipitates in a suitable solvent, each of the metal precipitates comprising at least one metal compound; and (ii) adding to the solvent an effective amount of at least one peroxide to form a product consisting essentially of a plurality of nanosized metal particles in the solvent.

According to preferred embodiments, the present invention is directed to a method for forming nanosized metal particles suspended in pure solvents, such as water, lower alkyl alcohols, such as methanol, ethanol and isopropanol, and lower alkyl substituted aromatics, such as toluene and the various xylenes (o-xylene, m-xylene and p-xylene). According to the present invention, additional separation and cleaning processes are not necessary. Such processes for producing nanosized particles suspended in pure solvents, generally, comprise synthesis of nanosized metal particles through the reaction between a metal precipitate and a peroxide, such as hydrogen peroxide. Optionally, the methods of the present invention include the synthesis of a metal precipitate including at least one metal compound.

According to certain preferred embodiments of the present invention, the metal precipitate includes at least one metal compound selected from the group consisting of metal oxalates, metal sulfides, metal sulfates, metal oxides, metal hydroxides, metal nitrates, and metal carbonates. Precipitates containing mixtures of two or more of the aforementioned metal compounds may also be employed.

Preferably, the metal compound includes at least one noble metal. Non-limiting examples of noble metals include Rhenium (Re), Ruthenium (Ru), Rhodium (Rh), Palladium (Pd), Silver (Ag), Osmium (Os), Iridium (Ir), Platinum (Pt), and Gold (Au). Additionally, combinations of two or more noble metals may be employed in the methods disclosed herein.

Alternatively, other thermally decomposable metal compounds may be employed. Such thermally decomposable metal compounds are known to those skill in the art. Non-limiting examples of thermally decomposable metal compounds include compounds containing Gallium (Ga), Arsenic (As), Lead (Pb), Nickel (Ni), Iron (Fe), Chromium (Cr), Cobalt (Co), Vanadium (V), Beryllium (Be), Magnesium (Mg), Calcium (Ca), Strontium (Sr), and Barium (Ba). Additionally, combinations of two or more thermally decomposable metal compounds may be employed in the methods disclosed herein.

Alternatively, combinations of at least one noble metal compound and at least one other thermally decomposable metal compound may be employed in practicing the methods of the present invention.

According to certain preferred embodiments of the present invention, the metal precipitate is produced by reacting a source of metal ions with a base. Preferably, the metal ions are noble metal ions. Suitable sources of metal ions are known in the art. For instance, a solution containing metal salts may be formed by dissolving a metal salt in a solvent. Such metal salts are commercially available and/or may be prepared according to methods and techniques known in the art. For example, a solution containing Ag ions prepared by dissolving $AgNO_3$ in water.

According to the present invention, suitable bases are those that form a metal precipitate with the metal ions. Suitable bases may be determined empirically by one having ordinary skill in the art using methods and techniques known in the art. Non-limiting examples of suitable bases include oxalates, carbonates, acetates, nitrates, sulfates, hydroxides and combinations thereof. For instance, bases may be supplied by dissolving an appropriate salt in the solution containing metal ions. Preferred examples of such salts include, but are not limited to NaOH, $NH_4OH$, $Na_2CO_3$, $K_2CO_3$, $CaCO_3$, $Cs_2CO_3$, $(NH_4)_2CO_3$ and the like. Such salts are commercially available and/or may be prepared according to methods and techniques known in the art.

According to the methods of the present invention, any suitable solvent may be used to prepare the metal precipitate. Non-limiting examples of suitable solvents include: water; lower alkyl alcohols, such as methanol, ethanol and/or isopropanol; lower alkyl substituted aromatics, such as toluene and/or the various xylenes; and mixtures thereof.

In still other preferred embodiments of the present invention, the solvent contains at least one surfactant and/or wetting agent. Suitable surfactants and wetting agents are known in the art.

Following formation of the metal precipitate, the precipitate is preferably separated from the solvent and washed with a solvent, such as distilled water. The precipitate may be separated from the solvent using methods and techniques known in the art, such as centrifugation and filtration. In other preferred embodiments of the present invention, the precipitate is washed multiple times with a solvent, such as water.

According to certain preferred embodiments of the present invention, the metal precipitate is sonicated, preferably in a small amount of solvent. Suitable sonication times may be determined empirically by one having ordinary skill in the art. Preferably, the metal precipitate is sonicated for 1 to 20 minutes per 100 mg of metal contents, more preferably 3 to 15 minutes, still more preferably 5 to 10 minutes and most preferably ten minutes, per 100 mg of metal contents. While ultrasonic waves are preferred for sonication, any suitable means of sonication known in the art may be employed.

To form the nanosized metal particles, the metal precipitate is first dispersed in a suitable solvent. Non-limiting examples of suitable solvents include: water; lower alkyl alcohols, such as methanol, ethanol and/or isopropanol; lower alkyl substituted aromatics, such as toluene and/or the various xylenes; and mixtures thereof. Preferably, the ratio of precipitate to solvent is about 100 mg of metal contents to about 0.010 to 3.0 liters of solvent.

In still other preferred embodiments of the present invention, the temperature of the solvent is above ambient temperature, preferably 50° C. to 100° C.

Following dispersion of the metal precipitate in the suitable solvent(s), a suitable peroxide, such as hydrogen peroxide, is added to the solvent containing the metal precipitate. The peroxide is added to the solvent in an amount effective to form a product consisting essentially of a plurality of nanosized metal particles in the solvent. Preferably, the peroxide is added in an amount of from 2 ml to 100 ml per 100 mg of metal contents, more preferably 5 ml to 70 ml, still more preferably 7 ml to 50 ml, and still even more preferably −10 ml to 30 ml, per 100 mg of metal contents.

The amount of peroxide will depend, at least in part, on the amount of metal precipitate employed and the size of the reaction vessel. Generally, as the amount of metal precipitate increases, the amount of peroxide required per unit metal precipitate decreases. Suitable amounts may be determined empirically by one having ordinary skill in the art.

Preferably, the hydrogen peroxide is added with stirring and/or while bubbling an inert gas through the solvent. Preferably, the inert gas is nitrogen or argon.

Nanosized metal particles having a broad range of average diameters may be produced according to the methods of the present invention. Preferably, the nanosized metal particles have an average diameter of 10 nm to 1,000 nm, more preferably 40 nm to 1,000 nm, and still more preferably 100 nm to 1,000 nm. Alternatively, the nanosized metal particles have an average particle size of 10 nm to 40 nm or 10 nm to 150 nm.

In order to remove any contaminating impurities remaining with the metal precipitate, it is preferable to rinse the metal precipitate with a solvent, such as distilled water. Optionally, the precipitate, together with a small amount of suitable solvent, is then sonicated. Preferably, the metal precipitate is sonicated for 1 to 20 minutes, more preferably 3 to 15 minutes, still more preferably 5 to 10 minutes and most preferably ten minutes, per 100 mg of metal precipitate.

According to the methods of the present invention, additional processing of the nanosized metal particles is not necessary, since the product produced consists essentially of the nanosized metal particles in the solvent. The nanosized metal particles may be separated from the solvent using techniques known in the art, such as centrifugation or filtration. For example, the nanosized metal particles and solvent are centrifuged at about 17,000 rpm for about 10 minutes.

The invention will now be illustrated using Silver (Ag). Water soluble silver salts, such as silver nitrate, silver sulfate, silver acetate, silver diamine nitrate, and silver diamine sulfate are preferred as a source of Ag ions. Silver carbonate or silver oxide precipitates are preferably used as silver compounds for the synthesis of nanosized silver particles. Precipitates of silver oxides or silver carbonate may be obtained, for instance, by adding NaOH or a carbonate compound, such as $Na_2CO_3$, $K_2CO_3$, $CaCO_3$, $Cs_2CO_3$, $(NH_4)_2CO_3$, and the like, to a solution containing Ag ions.

Preferably, a mixture of hot solvent, such as water, and Ag carbonate precipitate are mixed in a ratio in the range of 0.01-3 liter per 100 mg of Ag contents. The precipitates are preferably thoroughly dispersed throughout the solvent. Hydrogen peroxide, preferably 10 ml to 30 ml per 100 mg of silver contents, is added to the resulting solution under magnetic stirring and nitrogen bubbling. Regardless of the amount of added solvent, all particles in the solution are decomposed to metallic Ag by reaction with hydrogen peroxide. The amount of hydrogen peroxide added may be varied according to the amount of metal precipitates.

A particular advantage of the present invention is that the high purity nanosized metal particles are formed in pure solvent and have no minor contaminants. Therefore, they may be synthesized without additional separation and/or rinsing processes after reaction.

The methods of the present invention result in a product consisting essentially of nanosized metal particles and the solvent. Such particles may be widely used in industrial and medicinal fields that require high purity nanosized metal particles. For instance, nanosized Ag particles made according to the methods of the present invention may be used in anti-bacterial agents, burn creams, ointments, preservatives and mineral supplements. Additionally, if such particles are produced in water, the resulting solution is essentially harmless for human consumption, since only water and Ag particles are present with essentially no other impurities. Such Ag particles may also be applied to anti-microbial materials in other medical fields and in electronics fields, for instance, as a conductive material.

EXAMPLES

The following examples are illustrative, but not limiting, of the present invention. Other suitable modifications and adaptations are of the variety normally encountered by those skilled in the art and are fully within the spirit and scope of the present invention.

Example 1

Silver carbonate precipitates were made by completely mixing aqueous solutions of 10 ml of 0.1M $Na_2CO_3$ and 0.1M 10 ml $AgNO_3$ at room temperature. The precipitates were rinsed several times with DI water. After the precipitates were sonicated by ultrasonic waves for 10 min, 1 liter of DI water at 50° C. to 100° C. was mixed with the precipitates. 10 ml of hydrogen peroxide were then added to the precipitate solution under nitrogen bubbling and magnetic stirring. The nanosized Ag particles were separated by centrifugation at 17,000 rpm for 10 min. As shown in FIG. 1, Ag particles 1 having an average diameter of about 100 nm were obtained.

Example 2

Silver oxalate precipitates were made by completely mixing aqueous solution of 30 ml of 0.1M $AgNO_3$ and 30 ml of 0.1M sodium oxalate. The precipitates were rinsed multiple times with water. Then 8 ml of 5M sodium hydroxide was added to the precipitates. The precipitates were rinsed several times with water and 3 liter of water at 50 to 100° C. was mixed with the precipitates. 10 ml of hydrogen peroxide were then added to the precipitate solution under nitrogen bubbling and magnetic stirring. As shown in FIG. 2, Ag particles 2 having an average diameter of about 150 nm were obtained. Example 3

Precipitates were made by completely mixing aqueous solutions of 10 ml 0.1M $Na_2CO_3$ and 10 ml 0.1 $AgNO_3$ at room temperature. The precipitates were then rinsed with DI water. After the precipitates were sonicated by ultrasonic waves for 10 min, 70 ml of hydrogen peroxide were supplied to the precipitate solution. As shown in FIG. 3, Ag particles 3 having an average diameter of about 1 micron (1,000 nm) were obtained. Example 4

Gold oxide was prepared and rinsed several times with DI water. 1 liter of DI water at 50° C. to 100° C. was added to the gold oxide. 5-30 ml of hydrogen peroxide were added to the solution containing the gold oxide, under nitrogen bubbling. As shown in FIG. 4, Au particles 4 having an average diameter of 10 to 40 nm sized were obtained.

Having now fully described this invention, it will be understood to those of ordinary skill in the art that the methods of the present invention can be carried out with a wide and equivalent range of conditions, formulations and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method for forming nanosized metal particles, comprising:
   (i) dispersing a plurality of metal precipitates in a suitable solvent, each of said metal precipitates comprising at least one metal compound; and
   (ii) adding to said solvent an effective amount of at least one peroxide to form a product consisting essentially of a plurality of nanosized metal particles in said solvent, wherein said metal precipitates are selected from the group consisting of metal oxalates, metal sulfides, metal sulfates, metal oxides, metal hydroxides, metal carbonates and combinations thereof.

2. The method according to claim 1, wherein the ratio of metal precipitate to solvent is about 100 mg metal contents to 0.010-3.0 liters solvent.

3. The method according to claim 1, wherein said metal is at least one noble metal.

4. The method according to claim 3, wherein said at least one noble metal is selected from the group consisting of Re, Ru, Rh, Pd, Ag, Os, Ir, Pt, Au and combinations thereof.

5. The method according to claim 1, wherein said solvent is selected from the group consisting of water, lower alkyl alcohols, lower alkyl substituted aromatics and combinations thereof.

6. The method according to claim 5, wherein said solvent comprises a lower alkyl alcohol selected from the group consisting of methanol, ethanol, isopropanol and combinations thereof.

7. The method according to claim 5, wherein said alkyl substituted aromatic is toluene.

8. The method according to claim 1, wherein said metal precipitate comprises at least one metal selected from the group consisting of Re, Ru, Rh, Pd, Ag, Os, Ir, Pt and Au.

9. The method according to claim 1, wherein said metal precipitate is formed by reacting a source of metal ions with a base.

10. The method according to claim 9, wherein said base is selected from the group consisting of oxalate, carbonate, hydroxide and combinations thereof.

11. The method according to claim 9, wherein said source of metal ions is silver and said base carbonate or hydroxide.

12. The method according to claim 1, wherein said at least one metal compound is selected from the group consisting of silver carbonate and gold oxide.

13. The method according to claim 1, wherein said solvent contains no surfactant or at least one surfactant and/or wetting agent.

14. The method according to claim 1, further comprising bubbling an inert gas through said solvent.

15. The method according to claim 14, wherein said inert gas is argon or nitrogen.

16. The method according to claim 1, wherein the temperature of said solvent is above ambient temperature.

17. The method according to claim 16, wherein said temperature is 50° C. to 100° C.

18. The method according to claim 1, further comprising separating said nanosized metal particles by centrifugation or filtration.

19. The method according to claim 1, wherein said at least one peroxide is hydrogen peroxide.

20. The method according to claim 1, further comprising sonicating said solvent and said plurality of metal precipitates prior to adding said at least one peroxide.

21. The method according to claim 1, wherein a first portion of said at least one peroxide is added to said solvent and subsequently at least a second portion of at least one peroxide is added to said solvent.

22. The method according to claim 1, wherein said at least one peroxide is added to said solvent in a single step.

23. A method for forming nanosized metal particles, comprising:
   (i) dispersing a plurality of metal precipitates in a suitable solvent, each of said metal precipitates comprising at least one metal compound; and
   (ii) adding to said solvent an effective amount of at least one peroxide to form a product consisting essentially of a plurality of nanosized metal particles in said solvent, wherein said solvent toluene.

24. A method for forming nanosized metal particles, comprising:
   (i) dispersing a plurality of metal precipitates in a suitable solvent, each of said metal precipitates comprising at least one metal compound; and
   (ii) adding to said solvent an effective amount of at least one peroxide to form a product consisting essentially of plurality of nanosized metal particles in said solvent, wherein said at least one metal compound is selected from the group consisting of silver carbonate and gold oxide.

25. A method for forming nanosized metal particles, comprising:
   (i) dispersing a plurality of metal precipitates in a suitable solvent, each of said metal precipitates comprising at least one metal compound;
   (ii) adding to said solvent an effective amount of at least one peroxide to form a product consisting essentially of a plurality of nanosized metal particles in said solvent; and
   (iii) bubbling an inert gas through said solvent.

26. The method according to claim 25, wherein said inert gas is argon or nitrogen.

27. A method for forming nanosized metal particles, comprising:
   (i) dispersing a plurality of metal precipitates in a suitable solvent, each of said metal precipitates comprising at least one metal compound;
   (ii) adding to said solvent an effective amount of at least one peroxide to form a product consisting essentially of a plurality of nanosized metal particles in said solvent; and
   (iii) sonicating said solvent and said plurality of metal particles prior to adding said at least one peroxide.

* * * * *